United States Patent Office 3,544,452
Patented Dec. 1, 1970

3,544,452
FLUORINE AND METAL PHOSPHATE-CONTAINING CATALYSTS AND PREPARATION AND USE THEREOF
Joseph Jaffe, Berkeley, Calif., assignor to Chevron Research Company, San Francisco, Calif., a corporation of Delaware
No Drawing. Continuation-in-part of application Ser. No. 671,994, Oct. 2, 1967. This application July 8, 1968, Ser. No. 743,003
Int. Cl. C10g 23/02; B01j 11/06
U.S. Cl. 208—216     9 Claims

ABSTRACT OF THE DISCLOSURE

A hydrodesulfurization process utilizes a catalyst containing dispersed metal phosphate particles in an alumina matrix, at least one hydrogenating component selected from Group VI metals and compounds thereof and Group VIII metals and compounds thereof, and fluorine in an amount of 0.5 to 10 weight percent of the total catalyst. The alumina may be a porous xerogel; the metal phosphates may be selected from the phosphates of zirconium, titanium, tin, thorium, cerium and hafnium.

RELATED APPLICATION

This application is a continuation-in-part of Joseph Jaffe application Ser. No. 671,994, filed Oct. 2, 1967, now U.S. Pat. 3,493,517.

STATEMENT OF INVENTION

In accordance with the present invention there is provided a substantially non-siliceous catalyst composite comprising metal phosphate particles surrounded by a matrix comprising at least one solid oxide, at least one hydrogenating component, and combined fluorine, said hydrogenating component being selected from Group VI metals, particularly tungsten and molybdenum, and compounds thereof, and Group VIII metals, particularly nickel and cobalt, and compounds thereof.

In accordance with the present invention there is provided also a catalyst comprising a substantially non-siliceous, porous xerogel containing:

(a) nickel or cobalt, or the combination thereof, in the form of metal, oxide, sulfide, fluoride or any combination thereof, in an amount of 1 to 10 weight percent of said xerogel, calculated as metal, (b) molybdenum or tungsten, or the combination thereof, in the form of metal, oxide, sulfide, fluoride or any combination thereof, in an amount of 5 to 25 weight percent of said xerogel, calculated as metal, (c) a tetravalent metal or compound thereof selected from the group consisting of titanium, zirconium, thorium, tin, hafnium, cerium and compounds thereof, in an amount of 3 to 12 weight percent of said xerogel, calculated as metal, (d) phosphorus or a compound thereof, in an amount of 1.3 to 6.6 weight percent of said xerogel, calculated as phosphorus, (e) fluorine, in an amount of 0.5 to 10 weight percent of said xerogel, and (f) alumina, in an amount of at least 30 weight percent of said xerogel;

said xerogel having (a) a surface area above 100 square meters per gram,
(b) an average pore diameter above 60 A., and
(c) a porosity above 60 volume percent, macroscopic sections or fracture planes of pellets or other particles of said xerogel having a homogeneous appearance.

In accordance with the present invention there is provided also a catalyst comprising a substantially non-siliceous, porous xerogel containing:

(a) nickel or cobalt, or the combination thereof, in the form of metal, oxide, sulfide, fluoride, or any combination thereof, in an amount of 1 to 10 weight percent of said xerogel, calculated as metal, (b) molybdenum or tungsten, or the combination thereof, in the form of metal, oxide, sulfide, fluoride or any combination thereof, in an amount of 5 to 25 weight percent of said xerogel, calculated as metal, (c) a tetravalent metal phosphate selected from phosphates of titanium, zirconium, thorium, tin, hafnium, and cerium, in an amount of 8 to 35 weight percent of said xerogel, said tetravalent metal phosphate having a metal-to-phosphorus atomic ratio of at least 1:2, (d) combined fluorine, in an amount of 0.5 to 10 weight percent of said xerogel, and (e) alumina, in an amount of at least 30 weight percent of said xerogel;

said xerogel having (a) a surface area above 100 square meters per gram,
(b) an average pore diameter above 60 A., and
(c) a porosity above 60 volume percent, macroscopic sections or fracture planes of pellets or other particles of said xerogel having a homogeneous appearance.

In accordance with the present invention there is provided also the method of manufacturing a hydrocarbon conversion catalyst which comprises substantially uniformly dispersing metal phosphate particles in a substantially non-siliceous matrix comprising at least one solid oxide, at least one hydrogenating component, and combined fluorine, said hydrogenating component being selected from Group VI metals, particularly tungsten and molybdenum, and components thereof, and Group VIII metals, particularly nickel and cobalt, and compounds thereof.

In accordance with the present invention there is provided also the method of manufacturing a hydrocarbon conversion catalyst comprising a metal phosphate, a substantially non-siliceous solid oxide comprising alumina, a hydrogenating component, and combined fluorine, which comprises forming a suspension of substantially uniformly dispersed particles of said metal phosphate in a liquid comprising substantially uniformly dispersed precursors of said solid oxide, of said hydrogenating component, and of said combined fluorine, and causing said liquid to form a gel surrounding said particles of said metal phosphate.

In accordance with the present invention there is provided also the method of manufacturing a hydrocarbon conversion catalyst which comprises forming particles of a substantially water-insoluble metal phosphate by reacting in an aqueous medium, comprising at least one substantially non-siliceous precursor of at least one catalytic component of the final catalyst other than a metal phosphate, a water-soluble phosphate with a water-soluble compound of a Group IV metal, adding to said medium, if not already present therein, a compound of fluorine, a non-siliceous solid oxide precursor, and at least one compound selected from Group VI metal compounds, particularly tungsten compounds and molybdenum compounds, and Group VIII metal compounds, particularly nickel and cobalt compounds, and causing gelation of said medium, whereby said particles are surrounded by a gel matrix.

In accordance with the present invention there is provided also the method of preparing a substantially non-siliceous hydrocarbon conversion catalyst comprising a metal phosphate, at least one non-siliceous solid oxide, at least one hydrogenating component, and combined fluorine, which comprises forming a hydrous gel comprising at least one precursor of said solid oxide, at least one precursor of said hydrogenating component, and a fluorine compound, dispersing particles of a substantially water-insoluble metal phosphate substantially uniformly in said hydrous gel, and drying and calcining said hydrous gel containing said phosphate particles to produce said catalyst.

In accordance with the present invention there is provided also a method of preparing a substantially non-siliceous hydrocarbon conversion catalyst comprising a Group IV metal phosphate, a solid oxide comprising alumina, a metal or metal compound hydrogenating component, and combined fluorine, which comprises:

(a) forming a first mixture comprising water, an aluminum salt, and a salt selected from the group consisting of titanium salts and zirconium salts;

(b) adding to said mixture a soluble phosphorus compound at conditions under which addition of said phosphorus compound will cause precipitation of particles selected from the group consisting of titanium phosphate particles and zirconium phosphate particles, to produce a second mixture comprising said particles;

(c) adding to said second mixture a salt precursor of said hydrogenating component to produce a third mixture;

(d) converting said third mixture to a gelled mixture comprising a continuous-phase gel matrix, comprising precursors of alumina, and precursors of said hydrogenating component, surrounding said phosphate particles;

(e) including a fluorine compound in at least one of said first, second, third and gelled mixtures; and (f) treating said gelled mixture to convert the salts in said matrix to oxides and fluorides.

In accordance with the present invention there is provided also a hydrotreating process which comprises contacting a hydrocarbon oil with hydrogen under hydrotreating conditions in the presence of a catalyst comprising a substantially non-siliceous, porous xerogel containing a substantially uniform mutual interspersion of the components thereof, which components comprise nickel or cobalt, molybdenum or tungsten, a tetravalent metal phosphate, particularly titanium phosphate or zirconium phosphate, combined fluorine, and alumina.

In accordance with the present invention there is provided also a hydrodesulfurization process which comprises contacting a sulfur-containing hydrocarbon oil with hydrogen under hydrodesulfurization conditions in the presence of a substantially non-siliceous catalyst comprising a substantially uniform mutual dispersion of a tetravalent metal phosphate, at least one solid oxide, at least one hydrogenating component selected from the group consisting of Group VI metals, particularly tungsten and molybdenum, and compounds thereof, at least one hydrogenating component selected from the group consisting of Group VIII metals, particularly nickel and cobalt, and compounds thereof, and combined fluorine.

PRIOR ART

Prior art hydrocarbon conversion catalysts are known that contain metal phosphates, for example: (a) catalysts comprising a support impregnated with a soluble metal phosphate such as tungsten phosphate, rather than an insoluble metal phospahte; (b) catalysts comprising insoluble metal phosphates that are not discrete, selectively prepared, insoluble metal phosphate particles in a continuous-phase matrix of non-phosphate catalyst components, but that are miscellaneous phosphates that have resulted from a non-selective and indiscriminate reaction of a soluble phosphorus compound with a plurality of catalyst component precursors; and (c) catalysts comprising insoluble metal phosphates and a catalyst support but not containing a hydrogenating component.

Prior art catalysts also are known that are essentially silica-free and that contain fluorine, but such prior art catalysts do not contain the unique combination of components, and do not have the unique characteristics of the catalysts of the present invention.

DETAILED DESCRIPTION

General: The present invention is concerned with novel, substantially non-siliceous hydrocarbon conversion catalysts comprising phosphorus or a compound thereof, a tetravalent metal or a compound thereof, at least one solid oxide, at least one hydrogenating component, and fluorine, said hydrogenating component being selected from Group VI metals and compounds thereof and Group VIII metals and compounds thereof, and with methods of preparation and use of said catalysts. In accordance with a preferred embodiment of the present invention, said phosphorus and tetravalent metal are present as a substantially insoluble tetravalent metal phosphate. The term "insoluble" as used herein means substantially insoluble in any aqueous liquid medium at a pH below 8.

Preferred metal phosphate-containing catalysts of present invention and preparation thereof

(A) General (a) Utility: The catalysts have utility in various hydrotreating reactions, and particularly are outstanding as hydrodesulfurization catalysts.

(b) Bulk density: The catalysts generally have lower densities than similar catalysts that do not contain a metal phosphate. In general, the density and fouling rate of the catalyst decreases as the weight ratio of metal phosphate to other components of the catalyst rises. It is preferred to maintain the metal phosphate content of the final catalyst in the range of 8 to 35 weight percent of the total catalyst.

(B) Metal phosphate components and formation thereof (a) General: The metal phosphate components are more particularly phosphates of tetravalent metals, especially zirconium, titanium, tin, thorium, cerium and hafnium. The metal phosphate components may be preformed as insoluble particles and then dispersed in a hydrous gel containing precursors of the other catalyst components, or dispersed in a liquid medium containing said precursors, after which said liquid medium is converted to gel form. Alternatively, the metal phosphate components may be formed in situ in a liquid medium containing precursors of the other catalyst components, after which said liquid medium is converted to gel form. In any case, the metal phosphate particles may be prepared by reacting in an aqueous medium, preferably comprising a large stoichiometric excess of water, a water-soluble salt of one of the aforesaid tetravalent metals with a water-soluble source of phosphate ion.

(b) Excess of $H_2O$ when metal phosphates prepared separately: When the metal phosphates are prepared separately, it is convenient to maintain sufficient water in the reaction mix so that the reactants will react readily and so that the reaction will go to completion. The excess water also is useful in enabling the resulting slurry to be readily transportable.

(c) Water-soluble salt of tetravalent metal: The water-soluble salt of the aforesaid tetravalent metals may be any convenient salt. For example, the metal salt may be a metal chloride, oxychloride, nitrate, sulfate, acetate, iodide or bromide. As a further example, where zirconium is the tetravalent metal, the water-soluble zirconium salt may be any of the readily available zirconium salts such as zirconium tetrachloride, zirconyl chloride, zirconium sulfate, zirconyl bromide, zirconium tetraiodide and zirconyl iodide.

(d) Water-soluble source of phosphate ion: The water-soluble source of phosphate ion may be any water-soluble phosphoric acid or other water-soluble phosphorus compound, preferably in which the phosphorus has a valence of $+5$, that under the conditions of contact with the tetravalent metal salt will cause precipitation of metal phosphates. Such water-soluble sources of phosphate ion are those which will release $P_2O_5$, for example orthophosphoric acid, $H_3PO_4(2H_3PO_4 \rightarrow P_2O_5 + 3H_2O)$. Other suitable water-soluble sources of phosphate ion include: ammonium phosphate, $$NH_4H_2PO_4(2NH_4H_2PO_4 \rightarrow P_2O_5 + 2NH_3 + 3H_2O)$$

tetraphosphoric acid, $$H_6P_4O_{13}(H_6P_4O_{13} \rightarrow 2P_2O_5 + 3H_2O)$$

and metaphosphoric acid, $$HPO_3(4HPO_3 \rightarrow 2P_2O_5 + 2H_2O)$$

(e) Stoichiometric ratio of the soluble phosphorus compound to soluble tetravalent metal compound: It is especially preferred to avoid an amount of soluble phosphorus compound in excess of that which will provide sufficient phosphate ion to react with the soluble metal compound. Any excess of soluble phosphorus compound may act as a catalyst poison. In general, the molar ratio $P_2O_5:MeO_2(Me=Zr, Th, etc.)$ should not exceed 1:1, i.e., the metal-to-phosphorus atomic ratio should be at least 1:2. Such ratio will insure the absence of excess $P_2O_5$ which might act as a poison in the final catalyst. Although it is preferable not to use an excess of soluble phosphorus compound, it is permissible to use an excess of the tetravalent metal compound, because that excess generally is not detrimental to the final catalyst.

(f) pH ranges to be observed: When the metal phosphate particles are separately preformed and then added to a gel precursor of the other catalyst components, or added to a liquid medium containing precursors of said other components, the pH at which the addition is made is not critical, except that it should be a pH of 8 or below. Above a pH of about 8, the phosphate ion would be hydrolyzed from the metal phosphate particles, whereas at a pH below about 8, the metal phosphate particles remain insoluble. However, when the insoluble metal phosphate particles are formed in situ in an aqueous liquid medium containing precursors of the other catalyst components, it is important that the formation occur at a pH below about 3.0 and preferably at a pH below about 2.5, in order that the soluble phosphate ion source will react with the soluble tetravalent metal salt, but not with those of said precursors that are soluble only at a pH below about 3.0. That is, it is important to observe the indicated pH limitation in order to accomplish a selective precipitation of the desired insoluble metal phosphate particles before precipitation of the other catalyst components occurs. Once precipitation of the insoluble metal phosphate particles has occurred in the liquid medium containing precursors of the other catalyst components, the pH thereafter may be raised to cause gelation or precipitation of said precursors in which the insoluble metal phosphate particles are substantially uniformly distributed, without affecting the character of the insoluble metal phosphate particles, because once formed those particles remain insoluble and will not dissociate at a pH up to about 8.

It will be noted that if the non-metal phosphate components were first precipitated, and then were combined with a soluble phosphorus compound such as orthophosphoric acid, the phosphorus compound could react indiscriminately with components in addition to the soluble salts of the tetravalent metals that are intended to be converted to insoluble metal phosphates, for example with any aluminum salts and nickel salts that might be present. It is preferred to avoid such an indiscriminate reaction.

(C) Non-metal phosphate catalyst components and formation thereof (a) General: As previously indicated, and as will be further apparent from this section C, and from the examples hereinafter set forth, the non-metal phosphate catalyst components of the catalyst of the present invention may be formed in a substantially uniform interspersion thereof with the metal phosphate particles by: (1) being formed as a hydrous gel into which preformed phosphate particles are dispersed after formation of said gel; or (2) being formed as an aqueous solution, in which preformed metal phosphate particles are dispersed, followed by gelation of said solution around said particles; or (3) being formed first in part as a liquid medium in which the metal phosphate particles are formed by reaction of a soluble metal salt and a soluble phosphorus compound, followed by addition to said liquid medium of additional catalyst components, followed by gelation of the resulting liquid medium.

(b) Execss of $H_2O$: It is desirable in any liquid medium comprising precursors of the final non-phosphate catalyst components to maintain a large excess of water, preferably sufficient to maintain the solids content in the liquid medium below 10 weight percent and more preferably in the range 3 to 5 weight percent. Such a large excess of water will facilitate intimate mixing of the reactants and will insure that when the liquid is precipitated it will be readily stirrable. Additionally, because it is desirable to remove certain soluble salts from the resulting gel, and because such removal is conveniently accomplished by filtration and washing, a large excess of water during gel formation will facilitate removal of a maximum quantity of salts during the first filtration, thus facilitating subsequent washing steps.

(c) At least one solid oxide: The final catalyst comprises at least one substantially non-siliceous solid oxide, for example alumina. Those skilled in the art will easily be able to select the appropriate precursor compound suitable for producing the desired solid oxide. Where the solid oxide is to be alumina, the precursor of the alumina conveniently may be aluminum chloride.

(d) At least one hydrogenating component: The final catalyst composition comprises at least one hydrogenating component selected from Group VI metals and compounds thereof and Group VIII metals and compounds thereof, and preferably comprises both a Group VI metal or compound thereof, and a Group VIII metal or compound thereof. The Group VI component will be present in the final catalyst in an amount of 5 to 25 weight percent thereof, calculated as metal. The Group VIII component will be present in the final catalyst in an amount of 1 to 10 weight percent thereof, calculated as metal. Those skilled in the art will easily be able to select the appropriate precursor compound suitable for producing the desired hydrogenating component. Suitable precursors for Group VI hydrogenating components of the final catalyst include tungstic acid, sodium tungstate, ammonium tungstate, molybdenum chloride, sodium or ammonium molybdate, and the chlorides, acetates and nitrates of nickel and cobalt. It is preferable that nickel or a compound thereof and either tungsten or a compound thereof, or molybdenum or a compound thereof, be present in the final catalyst when it is to be used as a desulfurization catalyst. Catalysts prepared according to the process of the present invention that comprise nickel or a compound thereof and tungsten or a compound thereof, or that comprise nickel or a compound thereof and molybdenum or a compound thereof, are particularly outstanding hydrodesulfurization catalysts.

(e) Fluorine: The final catalyst comprises combined fluorine, in an amount of 0.5 to 10 weight percent fluorine, based on the final catalyst. The fluorine may be incorporated into the catalyst in any convenient manner that will result in a substantially uniform distribution of combined fluorine through the final catalyst. A preferred manner of incorporating the fluorine in the catalyst is by the addition of a soluble fluoride compound, for example sodium fluoride, ammonium fluoride, ammonium bifluoride or hydrofluoric acid. As previously discussed, the fluoride compound may be combined with the other catalyst components at any of various stages of catalyst preparation. The only criticality is that sufficient excess water still be present to permit achievement of a substantially uniform interspersion of fluorine with the other catalyst components by mixing.

(D) Catalyst filtering, drying, washing, activating, reducing and sulfiding (a) Filtering, drying and washing: Following gelation of all of the catalyst components, the resulting gel precipitate in the form of an aqueous slurry is separated from the liquid portion of the slurry by filtration in a conventional manner and the precipitate is washed and dried in a conventional manner. The drying may be accomplished in an oven at temperatures which conveniently may be between 200° and 300° F. for a time sufficient to produce adequate drying, for example 10 to 20 hours.

The precipitate may be washed until the material is free of undesired contaminants in the form of soluble salts. Particulraly where a sodium salt such as sodium tungstate has been used to prepare the catalyst or where chloride ion from metal chlorides is present, the wash water desirably will contain an ammonium salt such as ammonium acetate to assist in the ion-exchange removal of these impurities. A number of separate washes will be found desirable, including a final wash with water, after which the washed material may be dried in the previous manner.

(b) Activating: The resulting washed and dried mate-material is activated in a conventional manner, for example by calcination for 2 to 6 hours in dry air or other non-reducing gas at 800° to 1200° F., to produce the final catalyst in oxide form.

(c) Reducing and sulfiding: Following calcination, the hydrogenating component or components of the catalyst may be converted at least in part to metal form or sulfide form.

The calcined catalyst may be reduced and sulfided in a conventional manner, for example by treating it at a temperature of 500° to 700° F. in hydrogen gas containing $H_2S$ or a precursor thereof such as dimethyl disulfide, for a period of time sufficient to accomplish substantial conversion of the hydrogenating component or components to metal sulfides.

Catalyst use (A) General: As already indicated, the catalysts of the present invention are outstanding hydrodesulfurization catalysts.

(B) Hydrodesulfurization process operation: The hydrodesulfurization processes utilizing the catalysts of the present invention may be carried out at conventional hydrodesulfurization process conditions, for example at temperatures in the range 500° to 800° F., pressures in the range 200 to 10,000 p.s.i., LHSV's, based on the hydrocarbon oil feed, in the range 0.2 to 10 and at hydrogen rates of 500 to 20,000 s.c.f. of $H_2$ per barrel of hydrocarbon oil feed. A hydrodesulfurization process conducted under these conditions with the catalyst of the present invention will effect the removal of a substantial proportion of the sulfur compounds contained in a wide variety of hydrocarbon feedstocks, for example hydrocarbon distillates such as cracked naphthas, light cycle oils, coker distillates, straight-rung as oils, and residual hydrocarbon feedstocks.

EXAMPLE

The following example will serve to further illustrate the catalysts of the present invention and their preparation and use:

Four separate portions of an Arabian Atmospheric Residuum hydrocarbon feedstock were separately hydrodesulfurized in the presence of four different catalysts, including the catalyst of the present invention, at identical conditions. The hydrocarbon feedstock had the following characteristics:

| | |
|---|---|
| Gravity, ° API | 17.5 |
| Sulfur content, weight percent | 2.9 |
| Nitrogen content, parts per million | 1,310 |
| Asphaltene content, weight percent | 3.7 |
| Nickel content, parts per million | 8 |
| Vanadium content, parts per million | 30 |
| Iron content, parts per million | 5 |
| Sodium content, parts per million | 5 |

The hydrodesulfurization conditions were:

| | |
|---|---|
| Space velocity, v./v./hour | 1.2 |
| Total pressure, p.s.i.g. | 1,400 |
| Total hydrogen rate, s.c.f./bbl. | 10,000 |
| Product sulfur, weight percent | 0.5 |
| Starting temperature needed to maintain indicated product sulfur level | See below |

The catalysts used were:

| | Catalyst No. | | | |
|---|---|---|---|---|
| | 1 | 2 | 3 | 4 |
| BET surface area, $M^2/g$ | 224 | 315 | 321 | 227 |
| Average pore diameter, A | 57 | 48 | 55 | 90 |
| Porosity, volume percent | 53 | 63 | 65 | 70 |
| Components and amounts thereof as weight percentages of catalyst: | | | | |
| Ni | 8 | 8 | 8 | 8 |
| Mo | 24 | 25 | 20 | 20 |
| $TiO_2$ | | | 10 | 10 |
| $Al_2O_3$ | 38.8 | 52.3 | 44.5 | 40 |
| $SiO_2$ | 15 | | | |
| $P_2O_5$ | | | 5 | 5 |
| F | | | | 4.5 |

Catalysts 1–3 were comparison catalysts and Catalyst 4 was a catalyst according to the present invention. All catalysts were prepared by cogelation rather than impregnation procedures, to maximize homogeneity of the finished catalysts.

The hydrodesulfurization results were as follows:

| | Catalyst No. | | | |
|---|---|---|---|---|
| | 1 | 2 | 3 | 4 |
| Starting temperature, ° F | 748 | 732 | 727 | 723 |
| Catalyst fouling rate, ° F./hour | 0.14 | 0.058 | 0.06 | 0.055 |

The foregoing results corroborate my finding that in hydrodesulfurizing heavy hydrocarbon feedstock, particularly residual feedstocks, substantially improved results are obtained if the catalyst is substantially silica-free, compared with results obtained with a catalyst containing more than a few weight percent silica. This is surprising in view of prior knowledge that the presence of silica can be beneficial when hydrofining lighter feedstocks, particularly light distillates.

The foregoing results also corroborate my findings that, when a substantially silica-free catalyst is used, the presence therein of a tetravalent metal, phosphorus, and fluorine provides superior hydrodesulfurization activity and catalyst stability.

The foregoing results also corroborate my findings that for superior hydrodesulfurization efficiency, particularly when processing heavy feedstocks such as residual, the catalyst used should have not only the constituents of the catalyst of the present invention, but also should have a surface area above 100 square meters per gram ($m.^2/g.$), a porosity above 60 volume percent, and an average pore diameter above 60 angstroms (A.).

From the foregoing, it may be seen that the present invention provides novel and effective hydrotreating catalysts, particularly hydrodesulfurization catalysts, novel methods of preparing said catalysts, and further provides methods for using said catalysts which produce improved results compared with corresponding use of prior art catalysts.

Although only specific embodiments of the present invention have been described, numerous variations could be made in those embodiments without departing from the spirit of the invention, and all such variations that fall within the scope of the appended claims are intended to be embraced thereby.

What is claimed is:

1. A catalyst composite comprising:
   (A) a carrier comprising alumina and at least one hydrogenating component selected from Group VI metals and compounds thereof and Group VIII metals and compounds thereof, and
   (B) discrete, substantially insoluble metal phosphate particles
       (1) being dispersed in said carrier,
       (2) consisting essentially of at least one metal phosphate selected from phosphates of zirconium, titanium, tin, thorium, cerium and hafnium,
       (3) containing substantially the entire phosphorus content of said catalyst, and
       (4) containing phosphorus in an amount of 3 to 15 weight percent of the total catalyst, expressed as $P_2O_5$, and
   (C) fluorine, in an amount of 0.5 to 10 weight percent of said composite.

2. A catalyst composite as in claim 1, containing both a Group VI and a Group VIII hydrogenating component, said Group VI hydrogenating component being selected from molybdenum and compounds thereof and tungsten and compounds thereof and said Group VIII component being nickel or a compound thereof.

3. A catalyst composite as in claim 2, wherein said Group VI component is present in said composite in an amount of 5 to 25 weight percent, calculated as metal, and wherein said Group VIII component is present in said composite in an amount of 1 to 10 weight percent, calculated as metal.

4. A catalyst composite as in claim 1 wherein said carrier comprises alumina in the form of a porous xerogel, said Group VI metals are selected from the group consisting of molybdenum and tungsten, and said Group VIII metals are selected from the group consisting of nickel and cobalt.

5. A catalyst composite as in claim 1, particles of which when viewed in section have a homogeneous appearance.

6. The method of manufacturing a hydrocarbon conversion catalyst which comprises substantially uniformly dispersing discrete, substantially insoluble metal phosphate particles in a carrier comprising alumina, at least one hydrogenating component selected from Group VI metals and compounds thereof and Group VIII metals and compounds thereof, and fluorine, said metal phosphate particles
   (1) consisting essentially of at least one metal phosphate selected from phosphates of zirconium, titanium, tin, thorium, cerium and hafnium,
   (2) containing substantially the entire phosphorus content of said catalyst,
   (3) containing phosphorus in an amount of 3 to 15 weight percent of the total catalyst, expressed as $P_2O_5$, and
   said fluorine being present in said catalyst in an amount of 0.5 to 10 weight percent.

7. The method as in claim 6 wherein said hydrogenating component comprises both nickel or a compound thereof, and a component selected from molybdenum or compounds thereof and tungsten or compounds thereof.

8. The method as in claim 7 wherein said phosphate particles are dispersed in a liquid comprising precursors of the final catalyst components, said liquid is caused to gel around said particles, and the resulting composite is dried and calcined to produce the final catalyst.

9. A hydrodesulfurization process which comprises contacting a sulfur-containing hydrocarbon oil under hydrodesulfurization conditions with hydrogen and the catalyst of claim 1.

References Cited

UNITED STATES PATENTS

| | | | |
|---|---|---|---|
| 2,301,913 | 11/1942 | Veltman | 208—114 |
| 2,650,201 | 8/1953 | Mavity | 252—437 |
| 3,125,508 | 3/1964 | Adlington et al. | 208—216 |
| 3,130,147 | 4/1964 | Dwyer et al. | 252—437 |
| 2,726,195 | 12/1955 | Fleck et al. | 252—437 |

DELBERT E. GANTZ, Primary Examiner

G. J. CRASANAKIS, Assistant Examiner

U.S. Cl. X.R.

252—437, 441, 462